United States Patent [19]

Dobson, Jr. et al.

[11] Patent Number: 5,607,905
[45] Date of Patent: Mar. 4, 1997

[54] WELL DRILLING AND SERVICING FLUIDS WHICH DEPOSIT AN EASILY REMOVABLE FILTER CAKE

[75] Inventors: James W. Dobson, Jr., Houston; Thomas C. Mondshine, Sugarland, both of Tex.

[73] Assignee: Texas United Chemical Company, LLC., Houston, Tex.

[21] Appl. No.: 212,814

[22] Filed: Mar. 15, 1994

[51] Int. Cl.$^6$ .............................. C09K 7/02; E21B 37/00
[52] U.S. Cl. ........................... 507/211; 507/269; 166/300
[58] Field of Search .................................... 166/300, 376; 507/211, 261, 200, 269

[56] References Cited

U.S. PATENT DOCUMENTS

| | | | |
|---|---|---|---|
| 5,238,065 | 8/1993 | Mondshine et al. | 166/300 |
| 5,447,199 | 9/1995 | Dawson et al. | 166/300 |

*Primary Examiner*—Philip Tucker
*Attorney, Agent, or Firm*—Roy F. House

[57] ABSTRACT

The invention provides alkaline water base well drilling and servicing fluids which deposit an easily degradable and removable filter cake on the sides of a borehole during well drilling and servicing operations. The fluids contain one or more polysaccharide polymers, sized bridging particles, and a peroxide selected from the group consisting of alkaline earth metal peroxides, zinc peroxide, and mixtures thereof. The fluids deposit a filter cake containing the peroxide. The invention also provides processes for enhancing the removal of the filter cake which comprises depositing a peroxide-containing filter cake on the sides of the borehole, or on the filter cake already present on the sides of the borehole, and thereafter contacting the peroxide-containing filter cake with an acidic solution to activate the peroxide which thereafter degrades the polysaccharide polymers in the filter cake. Preferably the filter cake containing the degraded polymer is washed with a fluid in which the bridging particles are soluble to remove the entire filter cake(s) from the sides of the borehole.

17 Claims, No Drawings

WELL DRILLING AND SERVICING FLUIDS WHICH DEPOSIT AN EASILY REMOVABLE FILTER CAKE

PRIOR ART

The use of fluids for conducting various operations in the boreholes of subterranean oil and gas wells which contact a producing formation are well known. Thus drill-in fluids are utilized when initially drilling into producing formations. Completion fluids are utilized when conducting various completion operations in the producing formations. Workover fluids are utilized when conducting workover operations of previously completed wells.

One of the most important functions of these fluids is to seal off the face of the wellbore so that the fluid is not lost to the formation. Ideally this is accomplished by depositing a filter cake of the solids in the fluid over the surface of the borehole without any loss of solids to the formation. In other words, the solids in the fluid bridge over the formation pores rather than permanently plugging the pores. This is particularly critical in conducting horizontal drilling operations within the producing formations. Many clay-free fluids have been proposed for contacting the producing zone of oil and gas wells. See for example the following U.S. Patents: Jackson et al. U.S. Pat. No. 3,785,438; Alexander U.S. Pat. No. 3,872,018; Fischer et al. U.S. Pat. No. 3,882,029; Walker U.S. Pat. No. 3,956,141; Smithey U.S. Pat. No. 3,986,964; Jackson et al. U.S. Pat. No. 4,003,838; Mondshine U.S. Pat. No. 4,175,042; Mondshine U.S. Pat. No. 4,186,803; Mondshine U.S. Pat. No. 4,369,843; Mondshine U.S. Pat. No. 4,620,596; and Dobson, Jr. et al. U.S. Pat. No. 4,822,500.

These fluids generally contain polymeric viscosifiers such as certain polysaccharides or polysaccharide derivatives, polymeric fluid loss control additives such as lignosulfonates, polysaccharides or polysaccharide derivatives, and bridging solids.

After the wellbore fluid has completed its desired function, it is desirable to remove the filter cake before placing the well on production. When the bridging agent in the wellbore fluid is acid soluble, this is generally accomplished by displacing the wellbore fluid with a strongly acidic solution and allowing the acidic solution to contact the filter cake for a period of time which is sufficient to solubilize the bridging particles. These strongly acidic solutions require specialized equipment for their safe handling since they are extremely corrosive to equipment and on personal contact. When the bridging agent is water soluble, the wellbore fluid is displaced with a shale-inhibitive aqueous fluid which is undersaturated with respect to the water soluble bridging particles. This undersaturated fluid requires a long contact time to accomplish the solubilization of the water soluble bridging particles due to the encapsulating effect of the polysaccharide polymer or polymers present in the filter cake.

Processes are known in the art for removing polymeric minerals from a porous media such as a subterranean formation. See for example the following U.S. patents: Hanlon et al. U.S. Pat. No. 4,609,475; Brost U.S. Pat. No. 4,846,981; McGlathery U.S. Pat. No. 4,871,022.

It is disclosed in commonly owned Mondshine et al. U.S. Pat. No. 5,238,065 that polymer-containing filter cakes on the sides of a borehole can be removed by contacting the filter cake with a brine fluid comprising a peroxide selected from the group consisting of alkaline earth metal peroxides, zinc peroxide, and mixtures thereof, an aqueous brine, and an acidic substance to provide the brine fluid with a pH in the range from about 1 to about 8, and, optionally, an activator for the peroxide for a period of time at least sufficient to decompose the polysaccharide polymers therein and to at least partially dissolve the bridging particles therein such that the filter cake is removed from the formation. Preferably, the process for the removal of such filter cakes comprises contacting the filter cake with the brine fluid (soak solution) for a period of time at least sufficient to decompose the polysaccharide polymers therein to such an extent that the filter cake forms a loosely adherent mass on the sides of the borehole, and (2) thereafter contacting the sides of the borehole with a wash solution to remove the remaining filter cake solids therefrom, wherein the soak solution has no appreciable solubilizing effect on the bridging particles, and wherein the bridging particles are soluble in the wash solution. In a preferred embodiment wherein the bridging particles within the filter cake are water soluble, the aqueous liquid in the soak solution is an aqueous liquid in which the water soluble bridging particles are not soluble, preferably an aqueous liquid which is saturated with respect to the water soluble bridging material, and the wash solution comprises an aqueous liquid in which the water soluble bridging particles are soluble, hence which is unsaturated with respect to the water soluble bridging material.

The method of removing polymer-containing filter cakes disclosed in Mondshine et al. U.S. Pat. No. 5,238,065, incorporated herein by reference, while being an advance in the art, requires longer soak periods and/or higher concentrations of the peroxide than is desired, especially at the lower wellbore temperatures. Dissolving the peroxide in an acid solution initiates the release of oxygen which could be spent during the time for mixing and pumping operations. This premature release decreases the amount of active free radicals necessary for polymer degradation.

Thus there is still a need for a process of removing the filter cake from the sides of a borehole penetrating a hydrocarbon-bearing subterranean formation which will be effective over a broad temperature range in relatively short periods of time, and which will be easy and safe to use.

It is an object of this invention to provide well drilling and servicing fluids which deposit an easily removable filter cake on the sides of a borehole contacted by the fluids.

It is another object of this invention to provide processes for the removal of filter cakes containing one or more polysaccharide polymers and bridging particles from the sides of a borehole in a hydrocarbon-containing formation.

SUMMARY OF THE INVENTION

The present invention provides improved fluids for use in the drilling and/or servicing of oil and/or gas wells, and particularly drilling fluids, workover fluids, completion fluids, and other borehole fluids, the fluids characterized as depositing a filter cake which is easily removable from the sides of the borehole. The fluids are obtained by incorporating a peroxide selected from the group consisting of alkaline earth metal peroxides, zinc peroxide, and mixtures thereof, into the fluids of the prior art. Thus during use of the fluids the peroxide is incorporated within the filter cake as an integral component thereof. Subsequent contacting of the filter cake with an acidic solution activates the peroxide such that the polymers within the filter cake are degraded or decomposed thereby.

The present invention also provides a process for the removal of filter cakes containing one or more polysaccharide polymers from the sides of a borehole which comprises depositing within the filter cake as an integral component thereof a peroxide selected from the group consisting of alkaline earth metal peroxides, zinc peroxide, and mixtures thereof, and thereafter contacting the filter cake with an acidic solution to activate the peroxide such that the polymers within the filter cake are decomposed.

Another process for the removal of filter cakes containing one or more polysaccharide polymers from the sides of a borehole provided by the present invention comprises depositing a second filter cake having as an integral component thereof a peroxide selected from the group consisting of alkaline earth metal peroxides, zinc peroxide, and mixtures thereof, on the surface of the first filter cake on the sides of the borehole, and thereafter contacting the combined filter cakes with an acidic solution to activate the peroxide such that the polymers within the filter cakes are decomposed.

While the invention is susceptible to various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DETAILED DESCRIPTION OF THE INVENTION

As is disclosed in Mondshine U.S. Pat. No. 4,369,843, incorporated herein by reference, it is desirable to remove the filter cake or seal from the surface of a borehole in a hydrocarbon-containing formation in order to obtain maximum hydrocarbon production. Thus if the bridging particles in the filter cake are water soluble as disclosed therein, it is disclosed that the bridging particles can be dissolved and removed by the flow of produced field brine or by the injection of water or an unsaturated saline solution. If the bridging particles are acid soluble or oil soluble, there are utilized strongly acid solutions or oil, respectively, to remove the bridging particles.

It has been determined that the presence of polysaccharide polymers in the filter cake substantially increases the time required to remove the filter cake due to the encapsulation of the bridging particles by the polysaccharide polymer, and that considerable polysaccharide polymer remains on the surface of the borehole after the bridging particles are removed. Furthermore, it has been determined that the present method of removing the filter cake, wherein a wash liquid in which the bridging particles are soluble is used, does not adequately remove all of the filter cake due to the breakthrough of the wash liquid through a portion of the filter cake resulting in the wash liquid then being lost to the hydrocarbon-containing formations. Thus the wash liquid not only doesn't adequately remove the filter cake, it also may harm the formation depending on its composition and other characteristics as is well known in the art.

The water soluble polysaccharide polymers which may be present in the filter cake may be any of such polymers well known in the art. See for example the book "Handbook of Water-Soluble Gums and Resins," Robert L. Davidson, Editor, McGraw-Hill Book Co., 1980, incorporated herein by reference. Representative polymers include water soluble salts of alginic acid, carrageenan, gum agar, gum arabic, gum ghatti, gum karaya, gum tragacanth, locust bean gum, tamarind gum, cellulose derivatives such as hydroxyethyl cellulose, hydroxypropyl cellulose, carboxymethyl cellulose, hydroxyethyl carboxymethyl cellulose, and the alkyl cellulose ethers, starch ether derivatives such as carboxymethyl starch, hydroxyethyl starch, hydroxypropyl starch, and crosslinked. starch ethers, guar gum and its derivatives, such as hydroxypropyl guar, hydroxyethyl guar and carboxymethyl guar, biopolymers such as xanthan gum, gellan gum, welan gum, and the like. Usually the polysaccharide polymer is a cellulose ether, a starch ether which may be crosslinked, a modified guar gum, xanthan gum, gellan gum, welan gum, or mixtures thereof.

The present invention is based on the discovery that a filter cake containing one or more polysaccharide polymers can be removed from the surface of hydrocarbon-containing formations by depositing within the filter cake as an integral component thereof a peroxide selected from the group consisting of alkaline earth metal peroxides, zinc peroxide, and mixtures thereof, and thereafter contacting the filter cake with an acidic solution to activate the peroxide such that the polymers within the filter cake are decomposed. Subsequent placement or circulation of an appropriate fluid within the borehole removes the remainder of the filter cake from the sides of the borehole.

For the purpose of the present disclosure, the term "filter cake" is hereinafter intended to mean the filter cake which is present on the surface of a hydrocarbon-containing subterranean formation, i.e., the filter cake on the sides or face of a borehole within the formation, and which contains bridging solids and one or more polysaccharide polymers.

Also the term "aqueous brine" is intended to mean an aqueous solution containing one or more salts dissolved therein, such as potassium chloride, sodium chloride, ammonium chloride, and the like, and includes sea water.

The peroxides which are useful in this invention are selected from the group consisting of alkaline earth metal peroxides, zinc peroxide, and mixtures thereof. The preferred alkaline earth metal peroxides are calcium peroxide, magnesium peroxide, strontium peroxide, and barium peroxide. The preferred peroxide is magnesium peroxide.

Alkaline earth peroxides and zinc peroxide are known water insoluble compounds. See for example the following references, incorporated herein by reference: (a) "Peroxides, Superoxides, and Ozonides of Alkali and Alkaline Earth Metals," Il'ya Ivanovich Vol'nov (Translated by J. Woroncow, Edited by A. W. Petrocelli), Plenum Press, New York, 1966; (b) "Kirk-Ottuner Encyclopedia of Chemical Technology," Third Edition, Vol. 17, John Wiley & Sons, 1982, pp. 1–26.

Inorganic peroxide compounds are commonly described as compounds whose structures include the peroxo-group, —o—o—. Simple peroxide compounds include peroxides in which the peroxo-group is bonded to a metallic atom via ionic bonding, and includes hydroperoxides characterized by the presence of the hydroperoxyl ion $(HO_2)-$. Complex peroxide compounds include peroxides in which the peroxo-group as such, or in the form of $H_2O_2$ and $HO_2$, is bonded to the metallic atom by a covalent bond. Complex peroxide compounds also include the addition compounds formed with crystallized hydrogen peroxide.

The characteristic properties of peroxide compounds both simple and complex, are: the formation of hydrogen peroxide upon reaction with dilute acid solution, the liberation of oxygen as a result of thermal decomposition, and the liberation of oxygen upon reaction with water and other chemical agents. Further characterization is possible by dividing the simple inorganic peroxide compounds into four groups: (1) hydroperoxide, characterized by the $(HO_2)^-$ ion; (2) peroxides, characterized by the $(O_2)^{2-}$ ion; (3) superoxides characterized by the $(O_2)^-$ ion; and (4) ozonides, characterized by the $(O_3)^-$ ion.

The hydrolysis of peroxides and hydroperoxides proceeds as follows:

$$MO_2 + 2H_2O \longrightarrow M(OH)_2 + H_2O_2$$

and $$MOOH + H_2O \longrightarrow MOH + H_2O_2$$

where M=metal. For this reason, peroxides and hydroperoxides are considered as being derived from hydrogen peroxide by replacement of one or both the hydrogen atoms by metal atoms.

Complex peroxide compounds include peroxyhydrates, for example, $CaO_2 \cdot 2H_2O_2$, and peroxyhydrate hydrates, for example, $BaO_2 \cdot H_2O_2 \cdot 2H_2O$.

Peroxides of calcium, strontium and barium belong to the $M^{2+}O_2 2$-type of peroxide compounds, while peroxides of magnesium and zinc, of general formula $MO_2 \cdot xH_2O$, probably belong to the HO—M—OOH type where the covalent bond between the hydroperoxyl group and the metal atom is the same as that in hydrogen peroxide.

Calcium peroxide is generally prepared by industrial processes which provide a product containing 60–75 wt. % $CaO_2$. Reaction of $CaO_2 \cdot 8H_2O$ with solutions containing greater than 20 wt. % of hydrogen peroxide results in the formation of calcium peroxyhydrate, $CaO_2 \cdot 2H_2O_2$. Strontium peroxide, industrial grade, generally contains 80–95% $SrO_2$. Industrial grade barium peroxide generally contains up to about 90% $BaO_2$. Depending on its method of production, industrial grade magnesium peroxide contains from about 25% $MgO_2$ to about 50% $MgO_2$ and generally is a mixture of peroxide, oxide, and magnesium oxide hydrate. Industrial grade zinc peroxide contains about 55% $ZnO_2$. For all purposes of the present invention, the term "peroxide" includes all forms of the disclosed peroxides, including simple peroxides, such as hydroperoxides characterized by the $(HO_2)^-$ ion and peroxides characterized by the $(O_2)^-$ ion, and complex peroxides such as peroxyhydrates and peroxyhydrate hydrates.

Hereinafter whenever the term "peroxide of this invention" is used, it is intended to mean a peroxide selected from the group consisting of alkaline earth metal peroxides, zinc peroxide, and mixtures thereof.

The alkaline water base well drilling and servicing fluids (hereinafter referred to as "fluids") of this invention comprise any of such prior art fluids to which has been added the peroxide of this invention, provided the prior art fluids contain one or more polysaccharide polymers therein. Representative prior art fluids are disclosed in the following U.S. Patents, incorporated herein by reference: Jackson et al. U.S. Pat. No. 3,785,438; Jackson U.S. Pat. No. 3,953,335; Jackson et al. U.S. Pat. No. 3,993,570; Jackson et al. U.S. Pat. No. 4,003,838; Gruesbeck et al. U.S. Pat. No. 4,046,197; Mondshine U.S. Pat. No. 4,175,042; and Dobson, Jr. et al. U.S. Pat. No. 4,822,500. Generally the fluids contain an aqueous liquid which may be fresh water, a natural brine, sea water, or a formulated brine prepared by dissolving one or more soluble salts in water, a natural brine or sea water. Representative soluble salts are the chloride, bromide, acetate and formate salts of potassium, sodium, calcium, and magnesium. Representative polysaccharide polymers have been set forth hereinbefore. The preferred polysaccharides for use in this invention are starch derivatives, cellulose derivatives, and biopolymers, such as: hydroxypropyl starch, hydroxyethyl starch, carboxymethyl starch, and their corresponding lightly crosslinked derivatives; carboxymethyl cellulose, hydroxyethyl cellulose, hydroxypropyl cellulose, methyl cellulose, dihydroxypropyl cellulose, and their corresponding lightly crosslinked derivatives; xanthan gum, gellan gum, welan gum, and the like. The fluids of this invention are alkaline and thus preferably have a pH in the range from about 7 to 12, most preferably from about 7.5 to about 10.5. The pH can be obtained as is well known in the art by the addition of bases to the fluid, such as potassium hydroxide, sodium hydroxide, magnesium oxide, calcium hydroxide, and the like. The peroxide of this invention will also provide an alkaline pH.

The preferred fluids of this invention will contain one or more bridging agents as is well known in the art. The bridging agent may be acid soluble, such as sized calcium carbonate, limestone, marble, or dolomite, oil soluble, such as resins and waxes, or water soluble provided the water soluble bridging agent is not soluble in the aqueous liquid present in the fluid. The bridging agent may be insoluble such as sized particles of cellulosic materials, lignocellulosic materials, and the like. Indeed barite weighting material may function as a bridging agent in certain mud formulations.

It is preferred that the aqueous liquid comprises a saturated solution of a water soluble salt, most preferably sodium chloride or calcium chloride. It is also preferred that the bridging agent be water soluble, most preferably sized sodium chloride.

The fluids of this invention can be prepared by adding the peroxide of this invention to appropriate prior art fluids, or they can be prepared by adding to the desired aqueous liquid the polysaccharide polymers and peroxide of this invention, and, if desired, the bridging agent and other desired functional additives. It is preferred that the fluid contain from about 1 kg/m³ to about 50 kg/m³ of the peroxide of this invention, most preferably from about 2 kg/m³ to about 25 kg/m³.

It is preferred that the fluid of this invention contain one or more reducing agents or free radical scavengers to enhance the thermal stability of the fluid and avoid premature degradation of the polysaccharide polymers therein. Representative reducing agents are water soluble sulfites, bisulfites, thiosulfates, dithionites, and mixtures thereof, particularly the alkali metal or ammonium salts thereof, preferably a water soluble thiosulfate, most preferably sodium thiosulfate. Representative antioxidants or free radical scavengers include water soluble mercaptans, thioethers, thiocarbonyls, low molecular weight alcohols and glycols, and mixtures thereof.

The fluids of this invention when used in well drilling and servicing operations will deposit a filter cake on the sides of a borehole, the filter cake having as an integral component thereof the peroxide of this invention and the polysaccharide polymers.

The peroxide is activated by acids to soluble peroxides which react with the polysaccharide polymers in the filter cake to decompose them. The polysaccharide polymers may also be decomposed to some extent by the acid. The acid may also decompose any acid soluble bridging agents present in the filter cake depending upon the strength of the acid.

Thus it is another aspect of this invention to provide a process for enhancing the removal of a filter cake from the sides of a borehole in a subterranean formation, the filter cake being deposited during well drilling or servicing operations from an alkaline water base fluid containing one or more polysaccharide polymers therein, which comprises depositing with the filter cake as an integral component thereof the peroxide of this invention, and thereafter contacting the filter cake with an acidic soak solution to activate the peroxide for a period of time such that the polymer within the filter cake is decomposed.

After decomposing the polysaccharide polymers with the acid solution, it is preferred that the filter cake containing the decomposed polymer be washed with a wash fluid in which the bridging particles are soluble, such as by contacting or circulating within the borehole the washing fluid. In this manner, the major components of the filter cake are decomposed or removed, and the filter cake is essentially completely destroyed and removed from the sides of the borehole.

It is preferred that the acidic soak solution have no appreciable solubilizing effect on the bridging particles within the filter cake. This prevents the premature breakthrough of the soak solution through a portion of the filter cake and, hence, allows all of the filter cake to be contacted by the soak solution until the peroxide has decomposed the polysaccharide polymers substantially. If the bridging particles are water soluble, preferably the aqueous liquid in the soak solution will be saturated with respect to the bridging particles. Thus if the bridging particles are sized sodium chloride, the aqueous liquid will preferably be saturated with respect to sodium chloride. Additionally, the soak solution should have a density which is compatible with the density of the liquid in the borehole which the soak solution displaces in order to minimize mixing of the soak solution with the liquid. Preferably the soak solution contains inorganic water soluble salts dissolved therein in amounts up to saturation to provide the desired density. Typical salts are generally selected from the group consisting of sodium chloride, sodium bromide, potassium chloride, potassium bromide, calcium chloride, calcium bromide, zinc chloride, zinc bromide, and mixtures thereof. Certain of these salts are acidic, and, thus, they may also function as acidic substances to provide the required pH.

It is preferred that the soak solution be solids-free, i.e., contain no appreciable content of suspended solids, thus contains essentially only dissolved substances. The soak solution may be filtered using procedures well known in the art of using clear brine fluids, if desired.

The soak solution must be acidic to solubize and activate the peroxide in the filter cake. The pH should be less than about 6, most preferably less than about 5. Representative acidic substances include hydrochloric acid, phosphoric acid, formic acid, acetic acid, proprionic acid, glycolic acid, sulfamic acid, citric acid, aluminum chloride, zinc chloride, zinc bromide, calcium bromide, ferric chloride, sodium dihydrogen phosphate, sodium acid pyrophosphate, acidic buffers, and the like. Sulfamic acid and citric acid are preferred.

It is preferred that the acidic solution comprise an acid in a saturated solution of a water soluble salt in which the bridging particles are not soluble, and that the bridging particles are water soluble. It is particularly preferred that the water soluble salt and the bridging particles are sodium chloride.

The soak solution contacts the filter cake for a period of time which is at least sufficient to decompose the polysaccharide polymers in the filter cake to such an extent that the filter cake becomes a loosely adherent mass of bridging particles. The greater the acid strength or the higher the formation temperature, and hence, the higher the temperature to which the soak solution is heated, the lower the time required to contact the filter cake with the soak solution. Generally, the soak solution will contact the filter cake from one-half to ten hours. Thereafter the filter cake is preferably contacted with a wash solution to remove the remaining filter cake solids, principally the bridging particles and any remaining polymers and polymer degradation products.

The wash solution is one in which the bridging particles are at least partially soluble. Thus if the bridging solids are water soluble, the wash solution is undersaturated with respect to the bridging solids. If the bridging solids are acid soluble, a suitable acidic solution is used as the wash solution. If the bridging solids are oil or solvent soluble, a suitable oil or solvent is used as the wash solution.

It is preferred that the wash solution have no appreciable effect on the permeability of the hydrocarbon-containing formation. Thus aqueous solutions containing one or more salts which inhibit the swelling and/or dispersion of particles within the formation are preferred. Representative of such salts are potassium salts, such as potassium chloride and potassium acetate, ammonium chloride, quaternary ammonium salts of low molecular weight, such as tetramethyl ammonium chloride, tetraethylammonium chloride, and in general tetraalkylammonium salts in which the alkyl groups independently contain from 1 to about 4 carbon atoms, and other salts as is known in the art. Preferably the wash solution will contain from about 0.05% to about 10% by weight of the salt, most preferably from about 0.1% to about 5%.

It is particularly preferred that the wash solution contain from about 2% to about 5% by weight potassium chloride or ammonium chloride.

It is optional but preferred to use an activator in the acidic soak solution to further activate the peroxide and/or to increase the rate of reaction between the peroxide and the polysaccharide. Known activators include iron and copper salts as well as salts of other transition metals, such as soluble ferric, ferrous, cuprous, cobaltous, nickelous, manganous, and the like salts. The activator must be soluble in the soak solution. The preferred metallic cation activator is a source of the ferric or ferrous cation, such as ferrous sulfate, ferrous ammonium sulfate, ferrous chloride, ferric ammonium sulfate, and the like. The amount of activator, if used, is not critical and need only be sufficient to provide the desired rate of reaction. Generally, a metallic cation activator will be present in an amount from about 0.00025% to about 0.0025% by weight of the soak solution.

Other activators which are effective in the present invention have been discovered to be water soluble organic hydroxyl compounds having the empirical formula

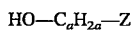

$$HO-C_aH_{2a}-Z$$

where a is an integer from 1 to about 5, and Z is a radical selected from the group consisting of H, OH, and $(OC_bH_{2b})_nOR$ where b is 2, 3, or mixtures thereof, n is an integer from 0 to about 3, and R is a radical selected from the group consisting of H, $C_xH_{2x+1}$, and $C_yH_{2y+1}CO$, where x is an integer from 1 to 5 and y is an integer from 1 to 3. Preferably a=2 or 3, and $Z=(OC_bH_{2b})_nOR$ provided that when n=o, $R=C_xH_{2x+1}$. Thus it is preferred that the water soluble hydroxy-containing organic compound activator contain at least one ether group or radical within its molecular structure. Generally, a water soluble organic hydroxyl compound activator will be present in the soak solution in an amount from about 0.1% to about 2.5% by volume, preferably from about 0.2% to about 1.0% by volume.

The following is a preferred typical embodiment of this process of the invention. This process is to be implemented during the drilling of the borehole, preferably prior to entering a hydrocarbon-containing formation with the fluid of this invention. The drilling fluid can contain one or more polysaccharide polymers, sized bridging particles, weighting particles, the peroxide of this invention, and preferably sodium thiosulfate as required for stability against free radicals at elevated temperatures. Drilling of the hydrocarbon-containing formations with this fluid will place a filter cake on the sides of the borehole containing the polysaccharide polymer(s), peroxide, and bridging particles. Once drilling has been completed, the following procedure is preferably implemented to remove the filter cake from the sides of the borehole. In the case illustrated, it is assumed that a 10.5 ppg fluid is required for well control.

1. Prepare the following fluids:
   a. Polymer/Sized Salt Displacement Pill (typically about 175 bbl): Prepare the pill by adding: 1.25 ppb of biopolymer; 3.75 ppb of crosslinked hydroxypropyl starch; 46 ppb of sized sodium chloride bridging particles, maximum particle size 44 microns; and 3 ppb magnesium peroxide to a 10.0 ppg sodium chloride brine.
   b. Displacement Brine (typically about 300 bbl): Sodium chloride solution having a density of 10.0 ppg.
   c. Spacer Fluid (typically about 50 bbl): Prepared a viscosified spacer fluid/push pill by adding 3 ppb of biopolymer to a 10.0 ppg sodium chloride brine. This concentration should yield a low shear rate viscosity at least three times greater than the Polymer Displacement Pill.
   d. Breaker Fluid (typically about 50 bbl): Prepare sufficient volume of Breaker Fluid to fill the screen-open hole annulus of the borehole, as follows: 2 ppb of sulfamic acid, 2 ppb citric acid, and 0.025 gal/bbl of liquid corrosion inhibitor in a 10.0 ppg saturated NaCl brine.
   e. Wash Fluid (typically about 800 bbl): Prepare an 8.8 ppg NaCl, 3% by weight KCl solution. It is preferred that all of the solids-free fluids be filtered.
2. Circulate the peroxide-containing drilling fluid from the open hole and approximately 500 feet of casing with the Polymer/Sized Salt Displacement Pill (a) followed by the Displacement Brine (b).
3. Displace the remaining drilling fluid system in the casing above the Polymer/Sized Salt Displacement Pill (a) with Displacement Brine (b).
4. Circulate the Displacement Pill (a) from the open hole with the viscosified Spacer Fluid (c) followed by the Breaker Fluid (d).
5. Spot the Breaker Fluid (d) (also called soak fluid herein) in the open hole romulus with the Wash Fluid (e) to cover the peroxide-containing filter cake on the sides of the borehole.
6. Soak the filter cake for four hours.
7. Circulate out the Breaker Fluid with the Wash Fluid.
8. Wash the open hole by circulating the Wash Fluid, monitoring chloride and turbidity levels to indicate dissolution of the sodium chloride particles from the filter cake.

During well drilling and servicing operations in which a filter cake containing one or more polysaccharide polymers and bridging agents therein is deposited on the sides of the borehole from an alkaline water base fluid containing the polymers and bridging agents, it is another aspect of this invention to provide a process to enhance the removal of the filter cake from the sides of the borehole which comprises depositing from a second alkaline water base fluid a second filter cake having as an integral component thereof the peroxide of this invention on the surface of the first filter cake on the sides of the borehole, and thereafter contacting the combined filter cakes with an acid solution to activate the peroxide, for a period of time such that the polymers within the filter cakes are decomposed.

The second alkaline water base fluid contains an aqueous liquid and the peroxide of this invention. Preferably it also contains a finely divided solid, preferably a water soluble finely divided solid which is not soluble in the aqueous liquid. Thus the second filter cake will contain both the peroxide and the finely divided solid. Most preferably, the aqueous liquid is a saturated solution of a water soluble salt. It is particularly preferred that the water soluble salt and the finely divided solid are sodium chloride.

After decomposing the polysaccharide polymers with the acid soak solution, it is preferred that the filter cake be washed with a fluid in which the bridging particles and the finely divided solid are soluble.

The washing can be accomplished by contacting or circulating with the borehole the washing fluid. When the bridging particles and/or the finely divided solid are water soluble, the washing fluid can be any aqueous liquid which is not saturated with respect to the bridging particles and/or finely divided solid. Preferably the washing fluid is a solution of potassium chloride.

The following is a preferred typical embodiment of this process of the invention. This process is to be implemented during the completion phase after drilling has been completed. The drilling fluid used during drilling contained one or more polysaccharide polymers, and preferably sized bridging agents and weighting particles. In the case illustrated, a 10.5 ppg salt system, mixed in a 10.0 ppg NaCl brine, is required for well control:

1. Prepare the following fluids:
   a. Peroxide Containing Displacement Pill (typically about 175 bbl): Prepare the pill by adding: 1.25 ppb of biopolymer; 3.75 ppb of crosslinked hydroxypropyl starch; 46 ppb of sized sodium chloride bridging particles, maximum particle size 44 microns; and 5 ppb magnesium peroxide to a 10.0 ppg sodium chloride brine.
   b. Displacement Brine (typically about 300 bbl): Sodium chloride solution having a density of 10.0 ppg.
   c. Spacer Fluid (typically about 50 bbl): Prepared a viscosified spacer fluid/push pill by adding 3 ppb of biopolymer to a 10.0 ppg sodium chloride brine. This concentration should yield a low shear rate viscosity at least three times greater than the Peroxide Containing Displacement Pill (a).
   d. Breaker Fluid (typically about 50 bbl): Prepare sufficient volume of Breaker Fluid to fill the screen-open hole annulus of the borehole, as follows: Mix a 5% HCl solution in fresh water with 85 ppb sodium chloride to saturate, 3 ppb citric acid, and 0.06 gal/bbl of liquid corrosion inhibitor.
   e. Wash Fluid (typically about 800 bbl): Prepare an 8.8 ppg NaCl, 3% by weight KCl solution. It is preferred that all of the solids-free fluids be filtered.
2. Circulate the polysaccharide containing drilling fluid from the open hole and approximately 500 feet of casing with the Peroxide Containing Displacement Pill (a). During the subsequent displacement and trip for the production screen, the pill will remain static, depositing a magnesium peroxide-containing filter cake on the existing filter cake. The pill (a) will be followed by the Displacement Brine (b).

3, Displace the remaining drilling fluid system in the casing above the Peroxide Containing Displacement Pill (a) with Displacement Brine (b).

4. Circulate the Displacement Pill (a) from the open hole with the viscosified Spacer Fluid (c) followed by the Breaker Fluid (d).

5. Spot the Breaker Fluid (d) (also called soak fluid herein) in the open hole annulus with the Wash Fluid (e) to cover the peroxide-containing filter cake on the sides of the borehole.

6. Soak the filter cake for one to four hours (the soak time decreases as the temperature increases).

7. Circulate out the Breaker Fluid with the Wash Fluid (e).

8. Wash the open hole by circulating the Wash Fluid, monitoring chloride and turbidity levels to indicate dissolution of the sodium chloride particles from the filter cake.

In order to more completely describe the invention, the following nonlimiting examples are given. In these examples and this specification, the following abbreviations may be used: API=American Petroleum Institute; ECHX-HPS=epichlorohydrin crosslinked hydroxypropyl starch; STS=sodium thiosulfate; bbl=42 gallon barrel; ppb=pounds per barrel; hr=hours; psi=pounds per square inch; °F.= degrees Fahrenheit; ppg=pounds per gallon; %=percent by weight; mm=millimeters; kg/m$^3$=kilogram per cubic meter; PV=plastic viscosity in centipoise; YP=yield point in pounds per 100 square feet; Gel=10 second/10 minute gel strengths in pounds per 100 square feet; LSV =Brookfield low shear viscosity at 0.3 revolutions per minute, in centipoise.

The plastic viscosity, yield point, and gel strengths were obtained by the procedures set forth in API's Recommended Practice 13B-1. The LSV was obtained for the fluids using a Brookfield Model LVTDV-I viscometer having a number 2 spindle at 0.3 revolutions per minute. The LSV is indicative of the suspension properties of the fluid, the larger the LSV, the better is the suspension of solids in the fluid.

In the examples to follow, the procedure used to prepare the filter cake and the laboratory procedure used to illustrate the process of removing the filter cake are as follows:

Filter Cake Deposition:

1. Select a 44.45 mm aloxite disk of 5 darcy permeability.
2. Permanently glue a "handle" to the disk to allow handling of the disk without disturbing the filter cake.
3. Attach the edge of the disk to the bottom of an API filter cell with a non-permanent "glue" such as silicone sealant.
4. Pour the fluid from which a filter cake is to be prepared into the API cell.
5. Pressure the cell to 100 psi and filter the fluid through the aloxite disk for 16 hours.
6. Remove the fluid from the cell. If the fluid did not contain a peroxide of this invention, add a peroxide-containing fluid as described herein, and pressure the cell to 100 psi for 16 hours to deposit a peroxide-containing filter cake on the first filter cake.
7. Empty the API cell and pry the aloxite disk off the bottom of the API cell while being careful not to disturb the filter cake.

Test Procedure:

1. Glue the aloxite disk on which the filter cake was deposited to the inside of a pint jar lid.
2. Screw the lid with the aloxite disk attached onto a pint jar filled with the solution heated to the desired soaking temperature.
3. Invert the pint jar and place it in a water bath or constant temperature oven set at the desired soaking temperature for the desired soaking time. The soak time can be varied to determine the optimum time for soaking. Note the condition of the filter cake and disk.
4. Transfer the pint jar lid containing the aloxite disk to a pint jar containing the wash solution. The wash solution is a 3% by weight potassium chloride solution unless otherwise indicated.
5. Roll the pint jar in a roller oven at the soaking temperature.
6. Check the filter cake every 5 minutes to determine the time required to clean the disk. The disk is considered clean when no filter cake covers the disk. The polymer is considered sufficiently degraded when any remaining filter cake from the disk is broken to a clear or slightly turbid solution.
7. Optimum soak time for the soak solution is established by measuring the effectiveness of the wash.

The magnesium peroxide used in the examples is a commercially available peroxide available from FMC Corporation. It has an active peroxide content of 16.9% minimum, and thus an active oxygen content of 7.95% minimum.

EXAMPLE 1

A well drilling and servicing fluid of this invention having the composition set forth in Table 1 was used to produce a filter cake containing magnesium peroxide as an integral component thereof. The filter cake was removed using the acidic soak solution, wash solution, and conditions set forth in Table 1. The results are set forth in Table 1.

EXAMPLE 2

Example 1 was repeated using the borehole fluid, acidic soak solution, wash solution, and conditions set forth in Table 2. The results are set forth in Table 2.

EXAMPLE 3

Example 1 was repeated using the borehole fluid, acidic soak solution, wash solution, and conditions set forth in Table 3. The results are set forth in Table 3.

EXAMPLE 4

Example 1 was repeated using the borehole fluid, acidic soak solution, wash solution, and conditions set forth in Table 4. The results are given in Table 4.

EXAMPLE 5

A water base well drilling and servicing fluid of the prior art containing the polysaccharide polymers xanthan gum and epichlorohydrin crosslinked hydroxypropyl starch and a sodium chloride bridging agent having the composition set forth in Table 5 was used to produce a filter cake as indicated hereinabove. A second filter cake containing magnesium peroxide as an integral component thereof was deposited on the first filter cake. The composition of the peroxide-containing fluid is given in Table 5. The combined filter cakes were removed from the disk using the acidic soak solution, wash solution, and conditions set forth in Table 5. The results are given in Table 5.

EXAMPLE 6

Example 5 was repeated except that the peroxide fluid composition was 0.94 bbl of a 10 ppg NaCl brine, 1.1 ppb xanthan gum, 4.2 ppb epichlorohydrin crosslinked hydroxypropyl starch, 10 ppb finely ground NaCl and 10 ppb magnesium peroxide. Identical results were obtained.

EXAMPLE 7

Well drilling and servicing fluids of this invention having the compositions set forth in Table 6 under Fluids No. 3–13 were prepared and evaluated for thermal stability. The data obtained are given in Table 6.

The data indicate that elevated temperatures activate the peroxide of this invention resulting in an at least partial decomposition of the polysaccharide polymers therein. The decomposition or degradation of the polymers was eliminated by the incorporation of the sodium thiosulfate reducing agent into the fluids of this invention. A close examination of the data indicate a major increase in the viscosity of the fluids after aging at elevated temperatures for the fluids containing both sodium thiosulfate and magnesium peroxide. The reason for such tremendous increase in viscosity is not known. It certainly cannot be explained by the elimination of the decomposition of the polymers since this would have resulted in at most only slight changes in the viscosities.

TABLE I

| | |
|---|---|
| Borehole Fluid | 0.94 bbl 10 ppg NaCl brine, 1.25 ppb xanthan gum, 3.75 ppb ECHXHPS, 45 ppb sized NaCl, 10 ppb Magnesium Peroxide |
| Filter Cake | On 5 darcy Aloxite disk, 16 hr. at 100 psi |
| Acidic Soak Solution | 5% HCl saturated with NaCl, 3 ppb citric acid |
| Soaking Conditions | 3 hr. at 150° F. |
| Results | All of filter cake removed from disk. |
| Wash Solution | 3% KCl |
| Wash Conditions | 5 minutes at 150° F. |
| Results | All of filter cake solublized. |

TABLE 2

| | |
|---|---|
| Borehole Fluid | 0.94 bbl 10 ppg NaCl brine, 1.25 ppb xanthan gum, 3.75 ppb ECHXHPS, 45 ppb sized NaCl, 2 ppb Magnesium Peroxide. |
| Filter Cake | On 5 darcy Aloxite disk, 16 hr. at 100 psi |
| Acidic Soak Solution | 5% HCl saturated with NaCl, 3 ppb citric acid |
| Soaking Conditions | 1 hr. at 150° F. |
| Results | All of filter cake removed from disk. Cake present as little pieces in soak solution. |
| Wash Solution | 5% KCl |
| Wash Conditions | 5 minutes at 150° F. |
| Results | Disk completely clean. Only a few particles present in the wash solution. |

TABLE 3

| | |
|---|---|
| Borehole Fluid | 0.94 bbl 10 ppg NaCl brine, 1.25 ppb xanthan gum, 3.75 ppb ECHXBPS, 45 ppb sized NaCl, 2 ppb Magnesium Peroxide, 0.25 ppb Sodium Thiosulfate. |
| Filter Cake | On 5 darcy Aloxite disk, 16 hr. at 100 psi |
| Acidic Soak Solution | 1% HCl saturated with NaCl, one ppb 10% ferric sulfate solution |
| Soaking Conditions | 1 hr. at 150° F. |
| Results | Cake fell off disk in one piece. Cake came apart in chunks on shaking. |
| Wash Solution | 3% KCl |
| Wash Conditions | 5 minutes at 150° F. |
| Results | Disk completely clean. Large polymer particles in wash solution. |

TABLE 4

| | |
|---|---|
| Borehole Fluid | 0.94 bbl 10 ppg NaCl brine, 1.25 ppb xanthan gum, 3.75 ppb ECHXHPS, 45 ppb sized NaCl, 2 ppb Magnesium Peroxide, 0.25 ppb Sodium Thiosulfate. |
| Filter Cake | On 5 darcy Aloxite disk, 16 hr. at 100 psi |
| Acidic Soak Solution | 12 ppb sulfamic acid plus one ppb 10% ferric sulfate solution in 10 ppb NaCl solution. |
| Soaking Conditions | 2 hr. at 150° F. |
| Results | Cake fell off disk in one piece which was floating in the soak solution. |
| Wash Solution | 3% KCl |
| Wash Conditions | 5 minutes at 150° F. |
| Results | Disk completely clean. Some large polymer particles in wash solution. |

TABLE 5

| | |
|---|---|
| Borehole Fluid | 0.94 bbl 10 ppg NaCl, 1.25 ppb xanthan gum, 3.75 ppb ECHXHPS, 45 ppb sized NaCl. |
| Filter Cake | On 5 darcy Aloxite disk, 16 hr. at 100 psi |
| Peroxide Fluid | 0.94 bbl 10 ppg NaCl, 50 ppb finely ground NaCl, 10 ppb Magnesium Peroxide. |
| Second Filter Cake | 16 hr. at 100 psi |
| Acidic Soak Solution | 5% HCl saturated with NaCl, 3 ppb citric acid |
| Soaking Conditions | 1 hr. at 150° F. |
| Results | Cakes broken up and fell off disk. Cake is very porous. Still slight bubbling of solution. |
| Wash Solution | 3% KCl |
| Wash Conditions | 5 minutes at 150° F. |
| Results | Disk clean. Very small amount of polymer suspended in solution. No undissolved salt. |

TABLE 6

Base Fluid: 0.94 bbl of a 10.0 ppg sodium chloride brine, 1.25 ppb xanthan gum, 3.75 ppb epichlorohydrin crosslinked hydroxypropyl starch, and 46 ppb sized sodium chloride.

| Fluid No. | 1 | 2 | 3 | 4 | 5 | 6 | 7 |
|---|---|---|---|---|---|---|---|
| MgO, ppb | 0 | 4 | 0 | 0 | 0 | 0 | 0 |
| Mg Peroxide, ppb | 0 | 0 | 2 | 2 | 2 | 3 | 3 |
| STS, ppb | 0 | 0 | 0 | 0.25 | 1 | 0.25 | 0.35 |

TABLE 6-continued

Base Fluid: 0.94 bbl of a 10.0 ppg sodium chloride brine, 1.25 ppb xanthan gum, 3.75 ppb epichlorohydrin crosslinked hydroxypropyl starch, and 46 ppb sized sodium chloride.

| Initial | | | | | | | |
|---|---|---|---|---|---|---|---|
| PV | 17 | 19 | 17 | 17 | 17 | 15 | 12 |
| YP | 22 | 26 | 23 | 23 | 25 | 25 | 25 |
| Gels | 10/13 | 12/16 | 11/14 | 11/14 | 11/15 | 11/14 | 11/15 |
| LSV | 31100 | 34500 | 26100 | 30900 | 34800 | 29800 | 35900 |
| pH | 7.4 | 9.3 | 9.3 | 9.5 | 9.4 | 9.5 | 9.55 |
| After Hot Roll at 190° F. for 16 hr. | | | | | | | |
| PV | 16 | 14 | 14 | 15 | 15 | 16 | 13 |
| YP | 28 | 36 | 23 | 34 | 39 | 25 | 41 |
| Gels | 12/15 | 13/17 | 4/5 | 12/13 | 13/18 | 5/6 | 14/16 |
| LSV | 30200 | 39500 | 2100 | 24400 | 60000 | 9700 | 39000 |
| pH | 5.75 | 9.5 | 9.4 | 9.4 | 9.4 | 9.35 | 9.55 |

| Fluid No. | 8 | 9 | 10 | 11 | 12 | 13 | 14 |
|---|---|---|---|---|---|---|---|
| MgO, ppb | 0 | 0 | 0 | 0 | 0 | 0 | 0 |
| MgO$_2$, ppb | 4 | 4 | 5 | 5 | 5 | 5 | 5 |
| STS, ppb | 0.25 | 0.5 | 0 | 0.25 | 0.5 | 0.75 | 1 |
| Initial | | | | | | | |
| PV | 16 | 16 | 17 | 16 | 16 | 15 | 17 |
| YP | 24 | 21 | 26 | 25 | 26 | 27 | 27 |
| Gels | 11/14 | 11/13 | 12/15 | 11/14 | 12/15 | 12/15 | 12/15 |
| LSV | 29900 | 23300 | 35900 | 28000 | 32100 | 31100 | 25200 |
| pH | 9.6 | 9.5 | 9.5 | 9.6 | 9.6 | 9.6 | 9.6 |
| After Hot Roll at 190° F. for 16 hr. | | | | | | | |
| PV | 15 | 15 | 15 | 18 | 18 | 30 | 20 |
| YP | 22 | 54 | 28 | 38 | 70 | 65 | 87 |
| Gels | 5/6 | 16/19 | 5/6 | 8/9 | 21/24 | 20/24 | 27/30 |
| LSV | 10500 | 70900 | 4000 | 13100 | 83800 | 116800 | 133600 |
| pH | 9.55 | 9.55 | 9.6 | 9.5 | 9.5 | 9.4 | 9.4 |

EXAMPLE 8

A well drilling and servicing fluid of this invention having the composition set forth in Table 7 was used to produce a filter cake containing magnesium peroxide as an integral component thereof. The filter cake was contacted by the acidic soak solution set forth in Table 7 by hot rolling at 150° F. for the time set forth in Table 7. No quiescent soaking of the cake occurred, and no washing was undertaken since the filter cake was completely disintegrated after 2 hours.

TABLE 7

| | |
|---|---|
| Borehole Fluid | 0.94 bbl 10 ppg NaCl brine, 1.25 ppb xanthan gum, 3.75 ppb ECHXHPS, 46 ppb sized NaCl bridging agent, 5 ppb Magnesium Peroxide, and 0.75 ppb STS. |
| Filter Cake | On 5 darcy Aloxite disk, 16 hr. at 100 psi |
| Acidic Soak Solution | 1 ppb sulfamic acid, 2 ppb citric acid, one ppb 10% ferric sulfate solution, and 0.06% by volume corrosion inhibitor, all in 3% KCl solution. |
| Soaking Conditions | Hot rolled at 150° F. for the times indicated below. |
| Results | 0.5 Hour: No change. Cake attached to disk. |
| | 1 Hour: Cake removed from sides of disk. Cake appears thinned. |
| | 1.5 Hours: All of the cake gone except for a few patches of polymer on the disk. |
| | 2 Hours: Disk completely cleaned. Clear fluid. |

EXAMPLE 9

Well drilling and servicing fluids of this invention were prepared having the composition set forth in Table 3 except that the concentrations of magnesium peroxide and sodium thiosulfate were varied from 1 to 10 ppb and from 0.25 to 0.75 ppb respectively. Filter cakes containing magnesium peroxide were prepared as in Table 3. These were contacted with various acidic soak solutions containing (1) from 2.5 to 10 ppb sulfamic acid and from 1 to 2 ppb citric acid in a 10 ppg saturated NaCl brine, or (2) from 2% to 15% HCl saturated with NaCl containing 3 ppb citric acid. The soaking conditions ranged from 1 to 4 hours at 150° F. and the wash conditions ranged from 0 to 30 minutes at 150° F. In all cases 100% of the filter cake was removed from the disk. The wash solution was either a clear solution indicating complete solubilization of the filter cake or it contained a non-adherent polymer residue which in practice would be circulated out of the borehole.

EXAMPLE 10

The following lab procedure was conducted to illustrate the deposition of the peroxide-containing filter cake and its removal, and the effect which the process had on the return flow through the permeable filter medium, simulating the return flow through a permeable formation.

Procedure for Filter Cake Removal/Return Flow in HTHP Filtrate Cell

A. Establishing Core (Simulated Formation) Permeability

1. Place a Teflon liner inside 500 ml double-ended cement cell.
2. Place a 2 darcy Aloxite disk (10 micron) at bottom or HTHP cell and attach end cap.
3. Fill HTHP cell with 400 ml of filtered 3% KCl Brine.
4. With bottom stem (valve) closed, apply 100 psi of pressure inside HTHP cell.
5. Open bottom stem and start stop watch.
6. Determine the time for 300 ml to flow through disk.
7. Repeat steps 3–5 until a steady flow rate is established.
8. RESULT: In the present test, an initial flow rate of 32 seconds was obtained.

B. Build Filter Cake And Apply Breaker Soak Solution
1. Prepare fluid and place in liTliP cell for 16 hours at 250 psi arid 150° F. Leave bottom stem open throughout to allow filtrate to flow through. Fluid Composition: 0.94 bbl 10 ppg NaCl brine, 3.75 ppb xanthan gum, 1.25 ppb ECHXHPS, 0.3 ppb STS, 2 ppb Magnesium Peroxide, 46 ppb sized NaCl.
2. Prepare desired breaker/soak solution. In the present test, use 10% HCl saturated with NaCl containing 3 ppb citric acid.
3. Remove excess fluid from HTHP cell.
4. Gently pour desired breaker/soak solution on top of filter cake.

C. Simulate Wellbore Overbalance During Breaker Soak
1. Apply 250 psi of pressure at 150° F. and leave breaker/soak solution for 3 hours.

D. Apply Wash Solution And Simulate Mechanical Agitation During Circulation
1. Remove breaker/soak solution then gently pour filtered 3% KCl Brine (wash solution) in HTHP cell.
2. Apply 100 psi to cell, place HTHP cell in 150° F. roller oven, and roll for 15 minutes.
3. Pour off the wash solution and put fresh filtered 3% KCl Brine in cell. Repeat step D2.
4. Pour off wash solution then repeat steps A3–A7.
5. Result: In the present test, a flow rate of 40 seconds was obtained. Simulates leak-off potential during overbalanced circulation.

E. Simulate Return Flow of Formation Fluid Into The Wellbore
1. To test return flow, take disk out of cell, invert disk and put back in cell. Repeat steps A3–A7 to determine filter cake removal.
2. Result: In the present test, a flow rate of 29 seconds was obtained. The flow of fluid from the formation to the wellbore is faster than the initial flow rate. This indicates not only that the filter cake was removed, but the cake was slightly stimulated by the acid treatment.

What is claimed is:
1. A process for enhancing the removal of a filter cake from the sides of the borehole in a subterranean formation, the filter cake being deposited during well drilling or servicing operations from an alkaline water base fluid containing one or more polysaccharide polymers therein, which comprises depositing within the filter cake as an integral component thereof a peroxide selected from the group consisting of alkaline earth metal peroxides, zinc peroxides, and mixtures thereof, and thereafter contacting the filter cake with an acidic solution to activate the peroxide for a period of time such that the polymer within the filter cake is decomposed.

2. The process of claim 1 wherein the alkaline water base fluid contains bridging particles.

3. The process of claim 2 wherein the filter cake containing the decomposed polymer is washed with a fluid in which the bridging particles are soluble.

4. The process of claim 1 wherein the alkaline water base fluid contains a saturated solution of a water soluble salt having suspended therein particles of a water soluble bridging agent which are insoluble in the saturated solution.

5. The process of claim 4 wherein the filter cake containing the decomposed polymer is washed with a fluid in which the bridging particles are soluble.

6. The process of claim 4 wherein the acidic solution comprises an acid in a saturated solution of the water soluble salt.

7. The process of claim 6 wherein the filter cake containing the decomposed polymer is washed with a fluid in which the bridging particles are soluble.

8. A process for enhancing the removal of a filter cake from the sides of a borehole in a subterranean formation, the filter cake being deposited during well drilling or servicing operations from an alkaline water base fluid containing one or more polysaccharide polymers and a bridging agent therein, which comprises depositing a second filter cake having as an integral component thereof a peroxide selected from the group consisting of alkaline earth metal peroxides, zinc peroxides, and mixtures thereof, on the surface of the first filter cake on the sides of the borehole, said second filter cake being deposited from an alkaline water base fluid, and thereafter contacting the combined filter cakes with an acidic solution to activate the peroxide for a period of time such that the polymer within the filter cakes is decomposed.

9. The process of claim 8 wherein there is also deposited in the second filter cake as an integral component thereof particles of a finely divided solid.

10. The process of claim 9 wherein the combined filter cakes containing the decomposed polymers are washed with a fluid in which the bridging agent and particles of finely divided solid are soluble.

11. The process of claim 9 wherein the alkaline water base fluid contains a saturated solution of a water soluble salt having suspended therein the peroxide and the finely divided solid.

12. The process of claim 8 wherein the combined filter cakes containing the decomposed polymer are washed with a fluid in which the bridging particles are soluble.

13. The process of claim 8 wherein the bridging agent combines particles of a water soluble salt and wherein the acidic solution comprises an acid in a saturated solution of the water soluble salt.

14. The process of claim 9 wherein the bridging agent and the finely divided solid are water soluble and wherein the second alkaline water base fluid contains a saturated solution of a water soluble salt in which the bridging agent and the finely divided solid are not soluble.

15. The process of claim 14 wherein the acidic solution comprises an acid in a saturated solution of a water soluble salt in which the bridging agent and the finely divided solid are not soluble.

16. The process of claim 14 wherein the combined filter cakes containing the decomposed polymers are washed with a fluid in which the bridging particles are soluble.

17. The process of claim 15 wherein the combined filter cakes containing the decomposed polymers are washed with a fluid in which the bridging particles are soluble.

* * * * *